(12) United States Patent
Lima (10) Patent No.: US 11,076,660 B2
(45) Date of Patent: Aug. 3, 2021

(54) HOOK AND LOOP ARTIFICIAL MUSCLES

(71) Applicant: Lintec of America, Inc., Richardson, TX (US)

(72) Inventor: Marcio Dias Lima, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 16/556,863

(22) Filed: Aug. 30, 2019

(65) Prior Publication Data

US 2020/0069005 A1 Mar. 5, 2020

Related U.S. Application Data

(60) Provisional application No. 62/725,991, filed on Aug. 31, 2018.

(51) Int. Cl.
*A44B 18/00* (2006.01)

(52) U.S. Cl.
CPC ...... *A44B 18/0096* (2013.01); *A44B 18/0015* (2013.01); *A44B 18/0073* (2013.01)

(58) Field of Classification Search
CPC ............ A44B 18/0022; A44B 18/0026; A44B 18/0096; A44B 18/0015; A44B 18/0073; F03G 6/067
See application file for complete search history.

(56) References Cited

U.S. PATENT DOCUMENTS

| 3,009,235 | A | 11/1961 | Mestral |
| 3,083,737 | A | 4/1963 | Mestral |
| 6,039,741 | A | 3/2000 | Meislin |
| 6,742,227 | B2 * | 6/2004 | Ulicny ............... A44B 18/0003 24/303 |
| 6,766,566 | B2 * | 7/2004 | Cheng ............... A44B 18/0003 24/304 |
| 6,983,517 | B2 * | 1/2006 | Golden ............... A44B 18/0003 24/442 |

(Continued)

FOREIGN PATENT DOCUMENTS

JP 2018-240 A 1/2018

OTHER PUBLICATIONS

Japan Notice of Reasons for Rejection received in JP Application No. 2019-158313, dated Aug. 31, 2020 and English language translation.

(Continued)

*Primary Examiner* — Robert Sandy
(74) *Attorney, Agent, or Firm* — Greenblum & Bernstein P.L.C.

(57) ABSTRACT

A method for manufacturing a separable artificial muscle fastener includes: securing one or more muscle loops of an artificial muscle fiber to a substrate such that at least a portion of the one or more muscle loops extends out from the substrate; annealing the artificial muscle fiber to retain the one or more muscle loops; and cutting and removing a portion of the one or more muscle loops to transform the one or more muscle loops into one or more muscle hooks. When the one or more muscle hooks are engaged with one or more holders, actuating the one or more muscle hooks disengages the one or more muscle hooks from the one or more holders.

20 Claims, 5 Drawing Sheets

(56) References Cited

U.S. PATENT DOCUMENTS

| | | | | |
|---|---|---|---|---|
| 7,013,536 B2* | 3/2006 | Golden | ............... | A44B 18/0096 |
| | | | | 24/442 |
| 7,146,690 B2* | 12/2006 | Stanford, Jr. | ...... | A44B 18/0003 |
| | | | | 24/451 |
| 7,308,738 B2* | 12/2007 | Barvosa-Carter | ............................ | |
| | | | | A44B 18/0003 |
| | | | | 24/442 |
| 7,430,788 B2* | 10/2008 | Ottaviani | ........... | A44B 18/0003 |
| | | | | 188/267 |
| 9,784,249 B2 | 10/2017 | Li et al. | | |
| 2005/0000065 A1 | 1/2005 | Browne et al. | | |

OTHER PUBLICATIONS

Japan Official Action received in JP Application No. 2019-158313, dated Mar. 29, 2021 and English language translation thereof.

* cited by examiner

HOOK AND LOOP ARTIFICIAL MUSCLES

BACKGROUND OF INVENTION

Thermally driven torsional and tensional actuators based on twisted polymeric and carbon nanotube (CNT) fibers and yarns have a wide range of applications. Artificial muscle actuators may include twisted and/or coiled polymers have the advantage of low cost, high production volume, and design simplicity. Artificial muscle actuators may have advantages in specific applications because of the greatly simplified engineering and lower product costs.

SUMMARY OF INVENTION

In one aspect, one or more embodiments of the invention relate to a method for manufacturing a separable artificial muscle fastener. The method includes: securing one or more muscle loops of an artificial muscle fiber to a substrate such that at least a portion of the one or more muscle loops extends out from the substrate; annealing the artificial muscle fiber to retain the one or more muscle loops; and cutting and removing a portion of the one or more muscle loops to transform the one or more muscle loops into one or more muscle hooks. When the one or more muscle hooks are engaged with one or more holders, actuating the one or more muscle hooks disengages the one or more muscle hooks from the one or more holders.

In another aspect, one or more embodiments of the invention relate to a separable artificial muscle fastener that includes a first member and a second member. The first member includes a first substrate and one or more muscle hooks made of an artificial muscle fiber. The second member includes a second substrate and one or more holders secured to the second substrate. Upon an actuation of the one or more muscle hooks, the one or more muscle hooks disengage from the one or more holders.

In another aspect, one or more embodiments of the invention relate to a rotational artificial muscle fastener that includes a first member and a second member. The first member includes an artificial muscle fiber that rotates around a central axis of the artificial muscle fiber upon actuation of the artificial muscle fiber, wherein the central axis is along a length of the artificial muscle fiber. The first member further includes one or more hooks fastened radially to the artificial muscle fiber. The second member includes a substrate and one or more holders secured to the substrate. Upon the actuation, the artificial muscle fiber rotates and moves the one or more hooks with respect to the one or more holders.

Other aspects and advantages of one or more embodiments disclosed herein will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide separable artificial muscle fasteners that are made of artificial muscle fibers, and a method for manufacturing a separable artificial muscle fastener.

An artificial muscle fiber may be a fiber that is made of twist-spun polymeric fibers or nanofiber yarns. The fibers in the artificial muscle fiber may have been twisted to create a specific net bias angle with respect to the length of the artificial muscle fiber.

Upon powering the artificial muscle fiber (i.e., delivering energy to the artificial muscle fiber), the artificial muscle fiber may expand or contract, and because of the twist in the structure of the artificial muscle fiber, the expansion or contraction generates torsional and/or tensile forces (i.e., actuation). An effective way of powering the artificial muscle fibers is by delivering thermal energy to the artificial muscle fiber through radiation or electrical conduction. However, the artificial muscle fiber may be powered with other methods such as power induction, photo absorption, chemical reactions, etc.

The artificial muscle fiber may be designed to create a desired actuation based on the specific application for which the artificial muscle fiber is designed. One way to control the actuation is by determining the twist in the artificial muscle fiber. The more twist in the artificial muscle fiber, the more actuation that may be generated upon actuation of the artificial muscle fiber.

The artificial muscle fiber may include, but is not limited to, a polymer based fiber. For example, Nylon-6, Nylon-6,6, polyethylene, polyvinylidene fluoride, Nylon-6,10, Nylon-6,12, liquid crystalline polymers such as polyarylate, and combinations thereof may be included in the artificial muscle actuators. The artificial muscle fibers may also include carbon nanotube (CNT) based materials.

The specific characteristics of the artificial muscle fiber, such as width, material, twist, actuation, etc., may vary based on the specific application for which the artificial muscle fiber is designed.

In one or more embodiments of the invention, the artificial muscle fibers may be similar to artificial muscles (actuators) disclosed in U.S. patent application Ser. No. 14/610,905 filed Jan. 30, 2015, entitled "COILED AND NON-COILED TWISTED NANOFIBER YARN TORSIONAL AND TENSILE ACTUATORS." The contents of this application are hereby incorporated by referenced in its entirety.

One or more embodiments of the invention provide methods for easily manufacturing separable artificial muscle fasteners that can be controlled to fasten and unfasten. The manufacturing the separable artificial muscle fasteners may provide for less expensive fastening devices. In addition, controlling the fastening mechanisms of the separable artificial muscle fasteners may be preferred for users because the separable artificial muscle fasteners in accordance with one or more embodiments of the invention may fasten (engage) or unfasten (disengage) by simply controlling a power (e.g., an electric current) that is fed to the separable artificial muscle fasteners.

Figure 1A:
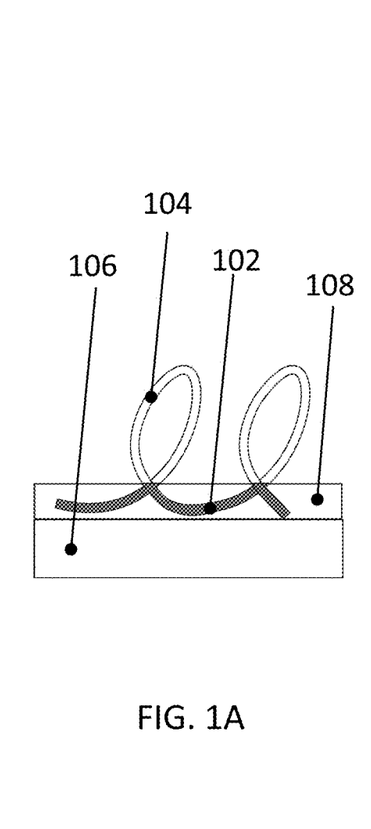
FIGS. 1A-1C show implementation examples in accordance with one or more embodiments of the invention.

In one or more embodiments of the invention, an artificial muscle fiber may be weaved or coiled to produce one or more loops from the artificial muscle fiber. For example, as shown in FIG. 1A, the artificial muscle fiber (102) is coiled to create artificial muscle loops (hereinafter referred to as muscle loops (104)). FIG. 1A shows only two muscle loops (104). However, there can be more or less muscle loops (104).

In one or more embodiments of the invention, the artificial muscle fiber (102) may be secured to a substrate. For example, as shown in FIG. 1A, the artificial muscle fiber (102) is secured to the substrate (106) via a securing medium (108). The securing medium (108) may be a type of glue, a textile, a tether, etc. For example, the artificial muscle fiber (102) may be partially embedded into a textile or a film.

In another example, the artificial muscle fiber (102) may be tethered into the substrate (106). It would have been apparent to one of ordinary skill in the art that other securing tools and methods such as nails, screws, etc., may be used.

The artificial muscle fiber (102) is secured in a way so that that at least some of the muscle loops (104) retain loop-shapes after securing. In one or more embodiments of the invention, the muscle loops (104) may be created while the artificial muscle fiber (102) is being secured to the substrate (106). For example, the artificial muscle fiber (102) may be tethered or glued to the substrate to simultaneously create the muscle loops (104).

In one or more embodiments of the invention, the artificial muscle fiber (102) may be annealed to retain the loop-shape of the muscle loops (104). In one or more embodiments, the artificial muscle fiber (102) may be annealed before or after securing the artificial muscle fiber (102) to the substrate (106). The artificial muscle fiber (102) may be annealed to a temperature at least above the glass transition temperature and below the melting temperature of the material of the artificial muscle fiber (102). The specific annealing temperature depends on the specific characteristics of the artificial muscle fiber (102), such as size dimensions of the artificial muscle fiber (102), materials used in the artificial muscle fiber (102), etc.

Figure 1B:
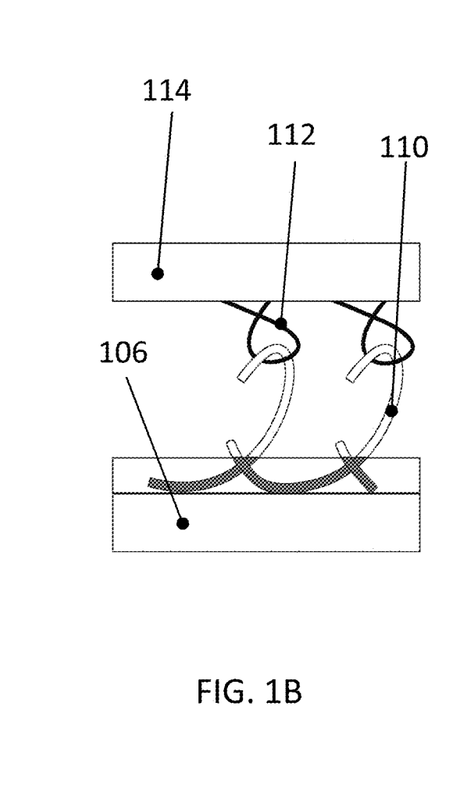

In one or more embodiments of the invention, the muscle loops (104) are transformed into hooks (hereinafter, referred to as muscle hooks) by cutting and removing portions of the muscle loops (104). For example, as shown in FIG. 1B in accordance with one or more embodiments of the invention, the muscle loops (104) of FIG. 1A are cut and a portion of the muscle loops (104) are removed to create the muscle hooks (110) of FIG. 1B.

In one or more embodiments of the invention, the muscle hooks (110) have a hook shape when the muscle hooks (110) are not actuated. However, the muscle hooks (110) may transform into a different shape when the muscle hooks (110) are actuated.

It would have been apparent to one of ordinary skill in the art that the muscle hooks (110) are not limited to regular hook-shapes, and may have other shapes that can function similar to a hook by engaging with a holder.

In one or more embodiments of the invention, the muscle hooks (110) may engage (fasten) a first body (e.g., a first substrate) to a second body (e.g., a second substrate) that includes one or more holders. For example, as shown in FIG. 1B in accordance with one or more embodiments of the invention, the muscle hooks (110) may engage with loops (112) that are connected to a substrate (114). This way, the muscle hooks (110) engage the substrate (106) that is connected to the muscle hooks (110) to a substrate (114) that is connected to the loops (112).

It would have been apparent to one of ordinary skill in the art that the holders are not limited to loops (112), and may be hooks or have any other shapes that function as a holder so that the muscle hooks (110) can engage with the holders. Further, the holders may also be conducted using artificial muscle fibers.

Figure 1C:
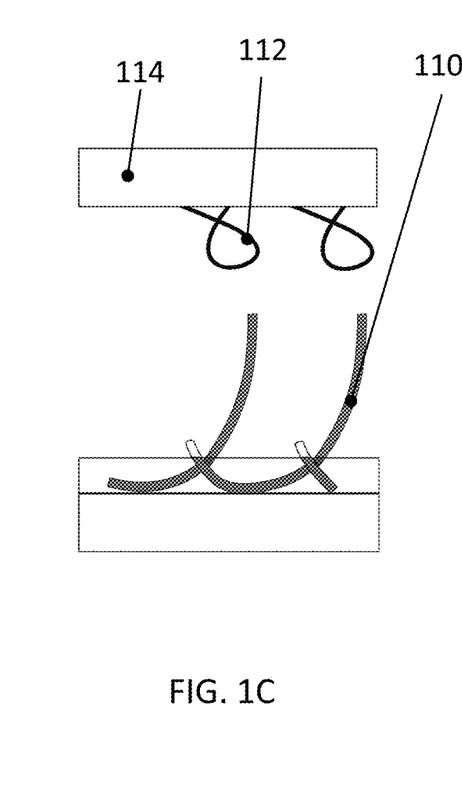

In one or more embodiments of the invention, upon actuation of the muscle hooks (110), the muscle hooks (110) may transform in shape, and the transformed muscle hooks (110) may disengage from the loops (114). For example, as shown in FIG. 1C in accordance with one or more embodiments of the invention, upon actuation of the muscle hooks (110), the muscle hooks (110) may open (e.g., straighten) and disengage from the loops (112).

In one or more embodiments of the invention, when the muscle hooks (110) cool down, the muscle hooks (110) may transform back into the initial hook-shape.

Figure 2A:
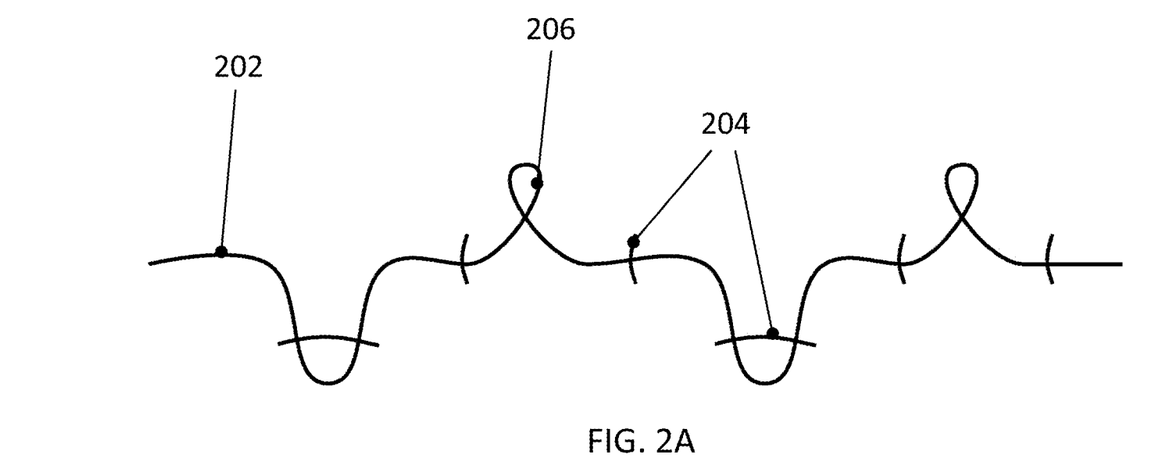
FIGS. 2A-2B show additional implementation examples in accordance with one or more embodiments of the invention.
Figure 2B:
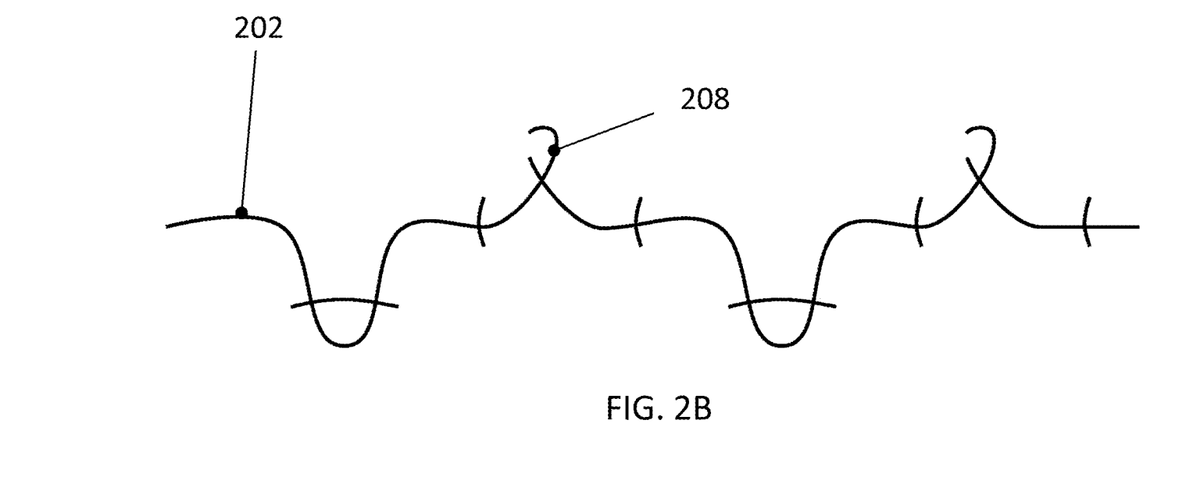

In one or more embodiments of the invention, the muscle hooks may be initially created and, then, the muscle hooks may be installed into a body/fastener. For example, as shown in FIG. 2A in accordance with one or more embodiments of the invention, an artificial muscle fiber (202) may be weaved and fastened to a substrate via securing fibers (204) to create muscle loops (206). After annealing the artificial muscle fiber (202), as shown in FIG. 2B in accordance with one or more embodiments, the muscle loops (206) shown in FIG. 2A may be cut and transformed into muscle hooks (208), shown in FIG. 2B. Then, the muscle hooks (208) may be actuated to engage with or disengage from a holder. The muscle hooks (208) may be separated from the artificial muscle fiber (202) and mounted onto a body/substrate.

Alternatively, in one or more embodiments of the invention, the device shown in FIG. 2B may function as a separable artificial muscle fastener.

In one or more embodiments of the invention, the securing fibers (204) may be electrical conductors and conduct electrical current to the muscle hooks (208) for the actuation. In these embodiments, the securing fibers may be made of CNT yarns, copper wires, or other conductors preferred by design or function.

In one or more embodiments of the invention, some of the muscle loops (206) may not be cut into the muscle hooks (208), and at least some of the muscle hooks (208) may engage with at least some of the uncut muscle loops (206). In one or more embodiments of the invention, the uncut muscle loops (206) and the muscle hooks (208) may be mounted on a same substrate or different substrates.

Embodiments of the invention are not limited to merely disengaging muscle hooks from holders. In fact, in one or more embodiments of the invention, an artificial muscle fastener may be designed and manufactured so that an opposite process to the disengagement process described above may occur. For example, the muscle loops may be cut into muscle pieces that may transform into muscle hooks upon actuation. In these embodiments, the muscle pieces are brought to vicinity of the holders and by actuating the muscle pieces, the muscle pieces transform into the muscle hooks and engage with the holders.

In one or more embodiments of the invention, the muscle pieces may be connected to an artificial muscle fiber and, upon actuation of the artificial muscle fiber and the muscle pieces, the artificial muscle fiber moves the muscle pieces to the vicinity of the holders, and the muscle pieces transform into the muscle hooks and engage with the holders.

Another way to fasten or unfasten hooks and holders in accordance with one or more embodiments of the invention is by using a rotational artificial muscle fiber to move the hooks with respect to the holders. Accordingly, one or more embodiments of the invention are directed to a rotational artificial muscle fastener that engages or disengages to holders by rotational actuations, and will be described with reference to FIGS. 3 and 4A-4C.

Figure 3:
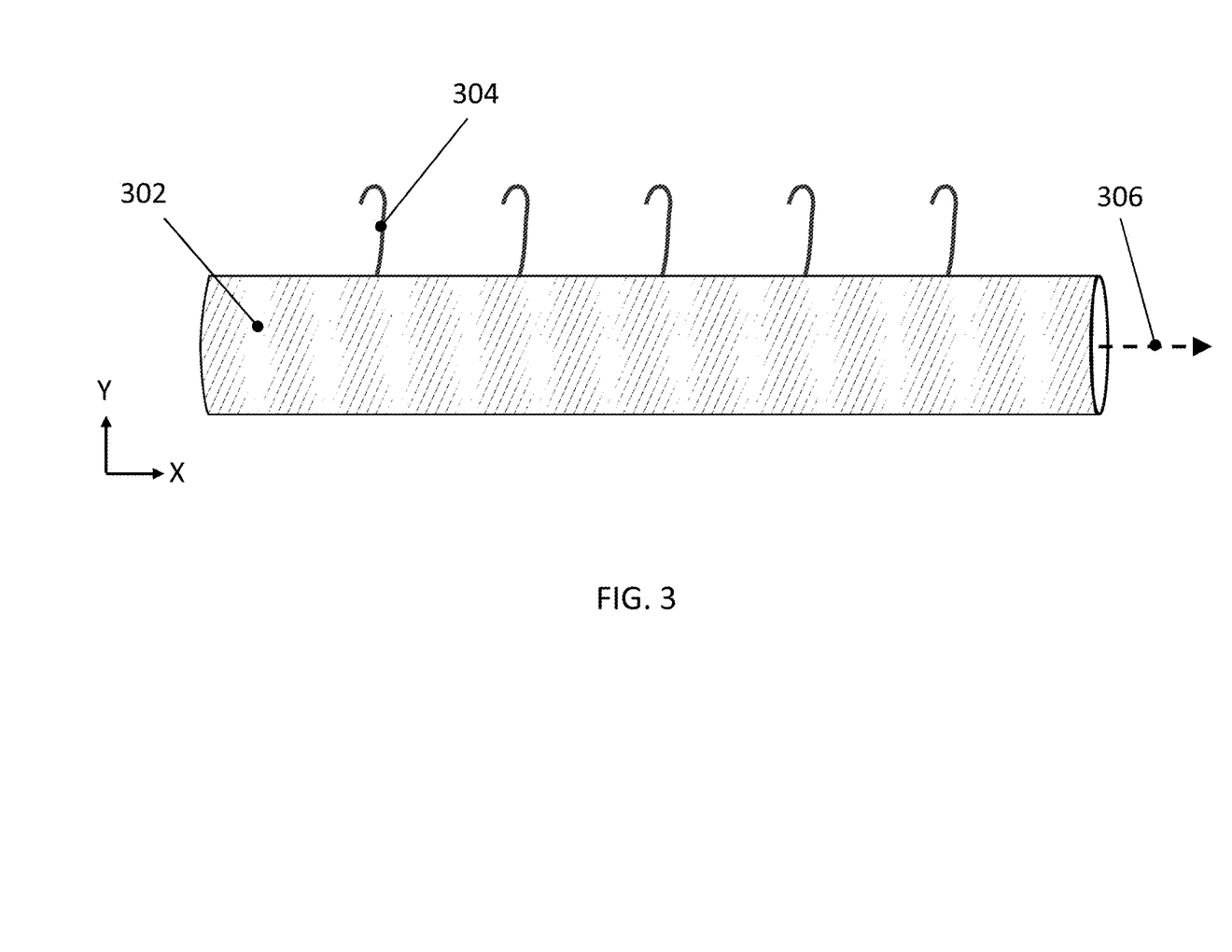
FIG. 3 shows an artificial muscle device in accordance with one or more embodiments of the invention.

FIG. 3 shows a rotational artificial muscle fastener that may include a rotational artificial muscle fiber (302). The rotational artificial muscle fiber (302) may or may not be fastened to a substrate. One or more hooks (304) are radially mounted on the rotational artificial muscle fiber (302). FIG. 3 shows that the hooks (304) are in line with each other. However, it would have been apparent to one of ordinary skill in the art that the hooks (304) may not be mounted in line with each other.

In one or more embodiments of the invention the hooks (304) may be mounted on the rotational artificial muscle fiber (302) via methods described above for securing an artificial muscle fiber to a substrate (e.g., glue, tether, etc.). It would have been apparent to one or ordinary skill in the art that the hooks (304) may be mounted with other tools or methods.

In one or more embodiments of the invention, the hooks (304) may be non-muscle hooks (regular hooks) or may be similar to the muscle hooks described above in accordance with one or more embodiments of the invention. In case of the muscle hooks, the muscle hooks may be created in accordance with one or more embodiments of the invention and, then be cut from the artificial muscle fiber from which the muscle hooks are created.

According to one or more embodiments of the invention, upon actuation of the rotational artificial muscle fiber (302), the rotational artificial muscle fiber (302) rotates radially around a central axis (306) of the rotational artificial muscle fiber (302) that is in a direction along X axis in the view of FIG. 3. The radial rotation of the rotational artificial muscle fiber (302) rotates the hooks (304).

In one or more embodiments of the invention, upon the rotation of the hooks (304), the hooks (304) may engage with or disengage from one or more holders. Below, the rotation and function of the rotational artificial muscle fastener are described with reference to FIGS. 4A-4C as implementation examples in accordance with one or more embodiments of the invention.

Figure 4A:
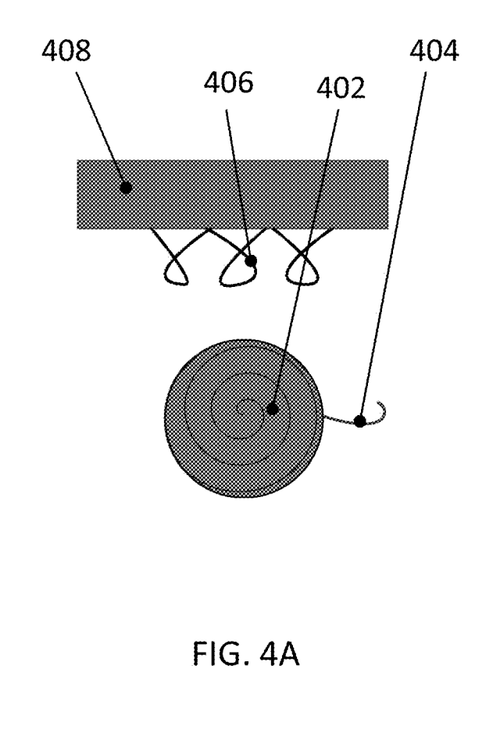
FIGS. 4A-4C show implementation examples in accordance with one or more embodiments of the invention.
Figure 4B:
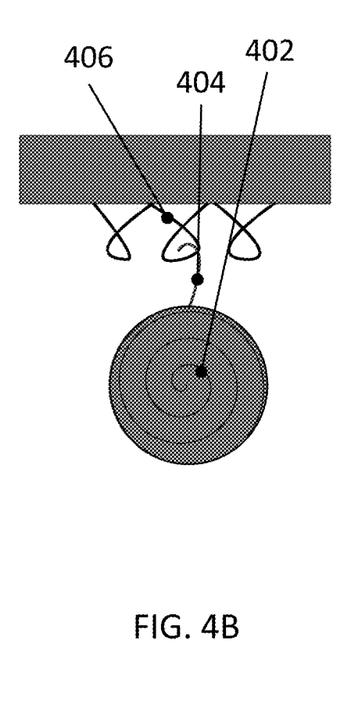

FIG. 4A shows a cross-sectional view of a rotational artificial muscle fiber (402). One or more hooks (404) are mounted on the rotational artificial muscle fiber (402). It would have been apparent to one of ordinary skill in the art that there may be a plurality of hooks (404) mounted on the rotational artificial muscle fiber (402). A plurality of holders (406) are mounted on a substrate (408) and disposed in a vicinity of the rotational artificial muscle fiber (402). As shown in FIG. 4B, upon actuation of the rotational artificial muscle fiber (402), the hooks (404) may rotate and engage with one or more of the holders (406).

In one or more embodiments of the invention, when the rotational artificial muscle fiber (402) cools down, the rotational artificial muscle fiber (402) may rotate backward, and thus, disengage from the holders (406).

In one or more embodiments of the invention, upon actuation of the rotational muscle fiber (402), the hooks (404) may disengage from the holders (406).

Figure 4C:
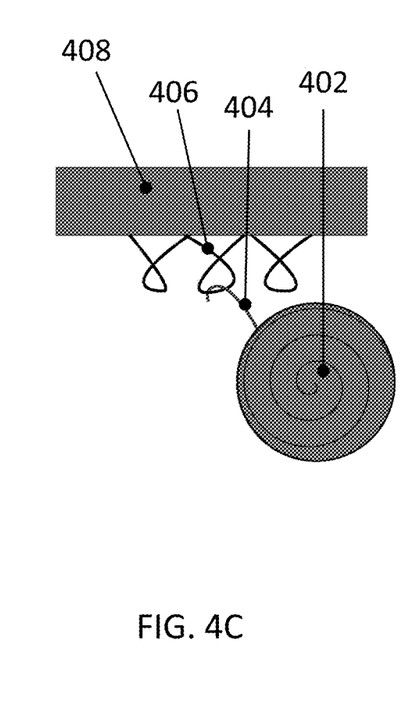

In one or more embodiments of the invention, upon actuation of the rotational artificial muscle fiber (402), the hooks (404) may engage with the holders (406) more tightly. For example, as shown in FIG. 4C, the rotational artificial muscle fiber (402) rotates and moves closer to the substrate (408).

It would have been apparent to one of ordinary skill in the art that the rotational artificial muscle fiber (302, 402) may be actuated to perform any combinations of the above-described functions (e.g., engaging, disengaging, and tightly engaging). For example, as shown in FIG. 4B, the rotational artificial muscle fiber (402) may be actuated to engage the hooks (404) with the holders (406), and then the rotational artificial muscle fiber (402) may be actuated more to further tighten the engagement of the hooks (404) with the holders (406), as shown in FIG. 4C.

It would have been apparent to one of ordinary skill in the art that the separable artificial muscle fasteners described above with reference to FIGS. 1A-1C and 2A-2B may be combined with the rotational artificial muscle fasteners described above with reference to FIGS. 3 and 4A-4C to perform specific functions. For example, the muscle hooks (110, 208) may be mounted on the rotational artificial muscle fiber (302, 402) to perform a combination of actuation of the muscle hooks (110, 208) and the rotational artificial muscle fiber (302, 402) to engage or disengage the muscle hooks (110, 208) with or from the holders (406).

Figure 5:
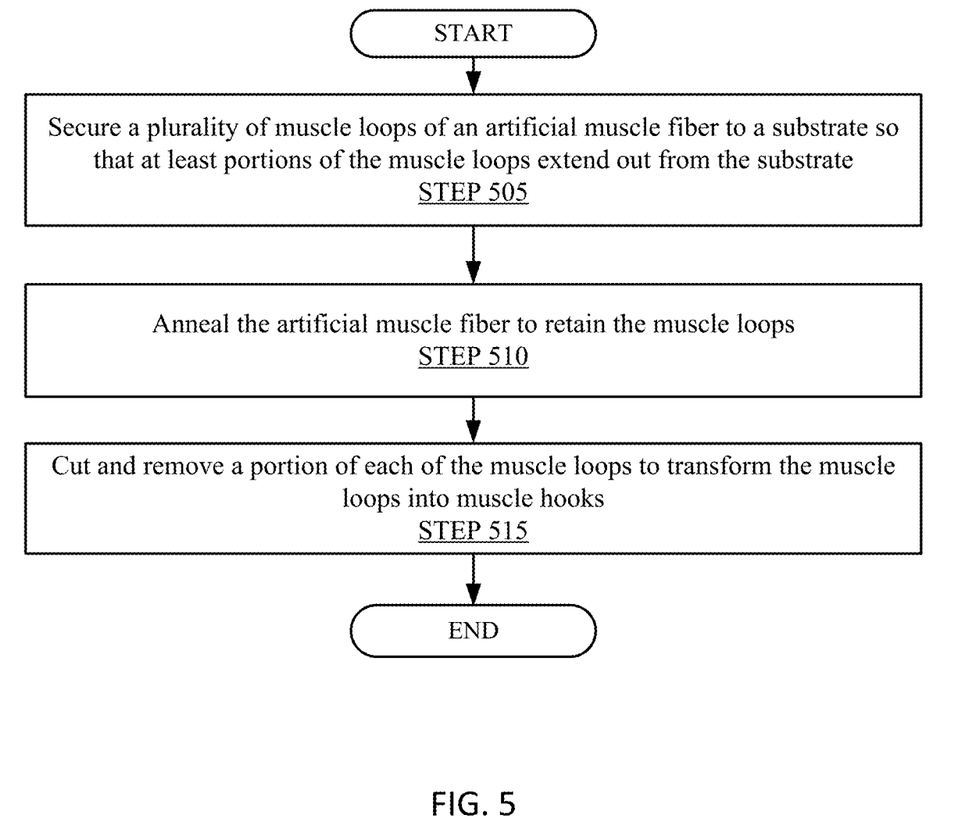
FIG. 5 shows a flowchart in accordance with one or more embodiments of the invention.

Further, FIG. 5 shows a flow chart in accordance with one or more embodiments of the invention. The flow chart depicts a method for manufacturing a separable artificial muscle fastener. In STEP 505, a plurality of muscle loops are secured to a substrate so that at least a portion of the muscle loops extend out from the substrate. For example, as shown in FIG. 1A, the muscle loops (104) are secured to the substrate (106) via the securing medium (108).

In STEP 510, the artificial muscle fiber is annealed so that the artificial muscle fiber will retain the loop-shape of the muscle loops. For example, the artificial muscle fiber (102) shown in FIG. 1A is annealed to retain the loop-shape of the muscle loops (106). STEP 510 may be performed before or after STEP 505.

In STEP 515, portions of the muscle loops are cut and removed to transform the muscle loops into muscle hooks. For example, the muscle loops (106) shown in FIG. 1A are transformed into the muscle hooks shown in FIG. 1B.

In one or more embodiments of the invention, STEP 510 may be performed before STEP 515 so that the muscle hooks retain hook-shapes. However, it would have been apparent to one of ordinary skill in the art that STEP 510 may be performed in concurrent with or after STEP 515.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A separable artificial muscle fastener, comprising:
a first member comprising:
a first substrate; and
one or more muscle hooks made of an artificial muscle fiber comprising polymeric fibers or nanofiber yarns, wherein the polymeric fibers or nanofiber yarns is twisted and/or coiled,
wherein the one or more muscle hooks are secured to the first substrate, and
wherein the one or more muscle hooks extend out from the first substrate,
a second member comprising:
a second substrate; and
one or more holders secured to the second substrate,
wherein, upon an actuation of the one or more muscle hooks, the one or more muscle hooks disengage from the one or more holders.

2. The separable artificial muscle fastener according to claim 1, wherein
the first substrate comprises one or more holders, and
the second substrate comprises one or more muscle hooks.

3. The separable artificial muscle fastener according to claim 2, wherein the one or more muscle hooks are embedded in a textile or a film.

4. The separable artificial muscle fastener according to claim 2, wherein the one or more holders comprise artificial muscle fibers.

5. The separable artificial muscle fastener according to claim 2, wherein the artificial muscle fiber is secured to the first substrate via a tether.

6. The separable artificial muscle fastener according to claim 1, wherein the one or more muscle hooks are embedded in a textile or a film.

7. The separable artificial muscle fastener according to claim 6, wherein the one or more holders comprise artificial muscle fibers.

8. The separable artificial muscle fastener according to claim 1, wherein the one or more holders comprise artificial muscle fibers.

9. The separable artificial muscle fastener according to claim 1, wherein the artificial muscle fiber is secured to the first substrate via a tether.

10. The separable artificial muscle fiber fastener according to claim 1, wherein the artificial muscle fiber comprises a polymer fiber selected from a group consisting of Nylon 6, Nylon 6,6, polyethylene, polyvinylidene fluoride, Nylon 6,10, Nylon 6,12, liquid crystalline polymers, polyarylate, and combinations thereof.

11. A method for manufacturing a separable artificial muscle fastener according to claim 1, the method comprising:
securing one or more muscle loops of the artificial muscle fiber to a first substrate such that at least a portion of the one or more muscle loops extends out from the first substrate,
annealing the artificial muscle fiber to retain the one or more muscle loops; and
cutting and removing a portion of the one or more muscle loops to transform the one or more muscle loops into respective one or more muscle hooks, such that when the one or more muscle hooks are engaged with the one or more holders, actuating the one or more muscle hooks disengages the one or more muscle hooks from the one or more holders.

12. The method according to claim 11, wherein the one or more muscle loops are secured by embedding the one or more muscle loops in a textile or a film.

13. The method according to claim 12, wherein the one or more muscle loops are secured to the first substrate via a tether.

14. The method according to claim 11, wherein the one or more muscle loops are secured to the first substrate via a tether.

15. A rotational artificial muscle fastener, comprising:
a first member comprising:
an artificial muscle fiber comprising polymeric fibers or nanofiber yarns,
wherein the polymeric fibers or nanofiber yarns is twisted and/or coiled,
wherein, upon an actuation of the artificial muscle fiber, the artificial muscle fiber rotates
around a central axis of the artificial muscle fiber, and
wherein the central axis is along a length of the artificial muscle fiber,
one or more hooks fastened radially to the artificial muscle fiber,
a second member comprising:
a substrate; and
one or more holders secured to the substrate,
wherein, upon the actuation, the artificial muscle fiber rotates and moves the one or more hooks with respect to the one or more holders.

16. The rotational artificial muscle fastener according to claim 15, wherein, upon the actuation, the one or more hooks engage with the one or more holders.

17. The rotational artificial muscle fastener according to claim 16, wherein, upon the actuation, the one or more hooks tightens the engagement with the one or more holders.

18. The rotational artificial muscle fastener according to claim 15, wherein, upon the actuation, the one or more hooks disengage from the one or more holders.

19. The rotational artificial muscle fastener according to claim 15, wherein
the first member comprises one or more holders, and
the second member comprises one or more hooks.

20. The rotational artificial muscle fastener according to claim 15, wherein the artificial muscle fiber comprises a polymer fiber selected from a group consisting of Nylon 6, Nylon 6,6, polyethylene, polyvinylidene fluoride, Nylon 6,10, Nylon 6,12, liquid crystalline polymers, polyarylate, and combinations thereof.

* * * * *